May 27, 1930.                    F. PFEIFFER                    1,760,209
REFRACTOMETER FOR LIQUIDS
Filed June 29, 1929

Inventor:
Fraukein Pfeiffer

Patented May 27, 1930

1,760,209

UNITED STATES PATENT OFFICE

FRANKLIN PFEIFFER, OF JENA, GERMANY, ASSIGNOR TO THE FIRM OF CARL ZEISS, OF JENA, GERMANY

REFRACTOMETER FOR LIQUIDS

Application filed June 29, 1929, Serial No. 374,689, and in Germany July 6, 1928.

The present invention refers to refractometers for liquids, which are provided with a deflection device allowing the boundary line between the light and the dark part of the field of view to be adjusted in accordance with a fixed mark in the field of view. These refractometers, generally, serve the purpose of ascertaining the refractive index of a liquid, referred to a certain temperature, or the concentration dependent upon the refractive index of a solution, and, in order to render unnecessary corrections of the data read off, the proposal has been made to have a deflection device provided not only for the adjustment of the boundary line according to the fixed mark, but to have still a second deflection device provided, and this in the path of the rays, whereby the said second deflection device is to be adjusted according to the temperature in each instance. Consequently, when measuring with these well-known refractometers, two deflection devices as well as two adjustments are required.

According to the invention, this inconvenience is avoided by connecting the deflection device for adjusting the boundary line with one part, viz. indicator or scale, of a reading device whose scale shows, dependent on the temperature, the refractive index or the concentration of a certain solution in the form of a diagram, and whose indicator is linear and graduated to represent either temperature degrees or reflective indices or concentrations in such a way that, after previous adjustment of the boundary line to the fixed mark, the refractive index or the concentration of the liquid can be read off at once. In this case it is expedient to have, as reading device, behind the measuring prism a pair of wedge-shaped glass bodies whose single wedges are connected with each other for movements in opposite direction.

Figure 1:
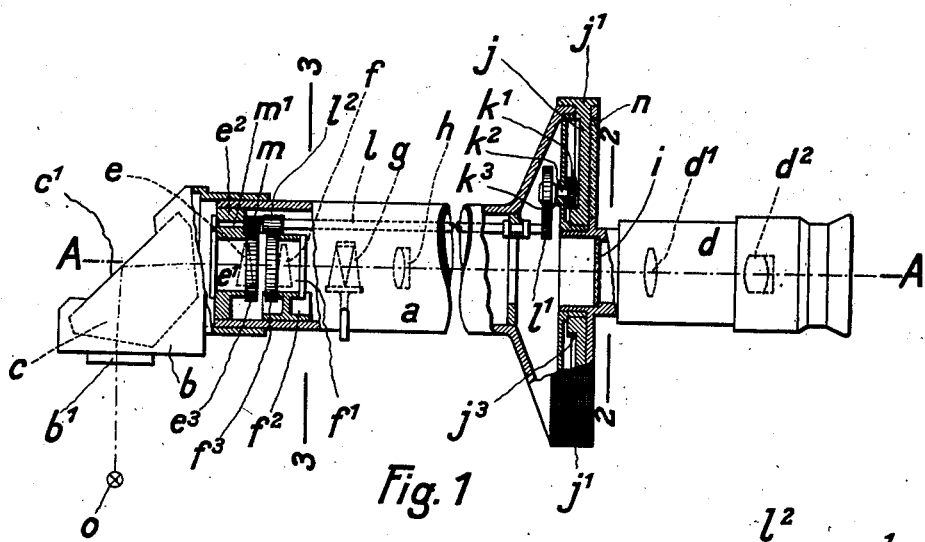
Figure 2:
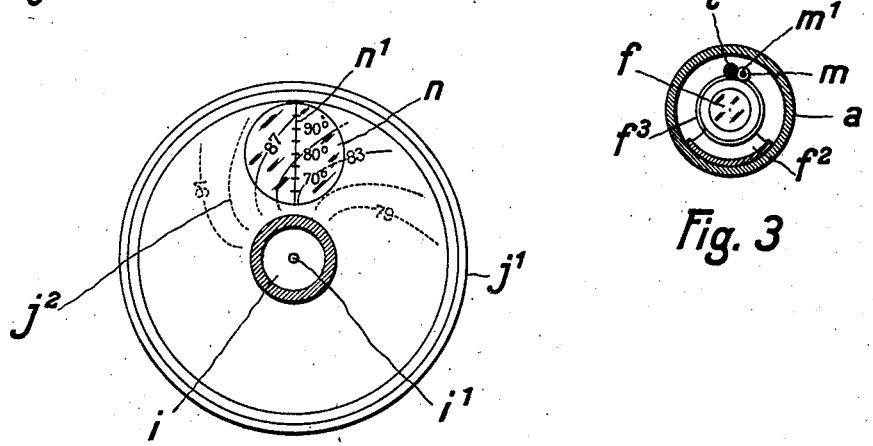
Figure 3:
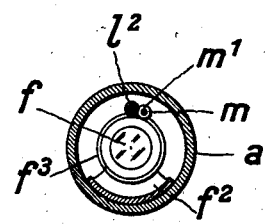

The drawings show in a constructional form an example of the invention. Figure 1 is a front elevation partially represented in a section. Fig. 2 a diagram on the plane of the line 2—2 of Fig. 1, and Fig. 3 a diagram on the plane of the line 3—3 of Fig. 1.

The refractometer represented by the drawing, which serves the purpose of examining solutions of sugar during the inspissation of same, contains a casing $a$ having a frame $b$ and a measuring prism $c$ slipped on at one end and an ocular $d$ with a field lens $d^1$ and an eyelens $d^2$ at the other. In the casing $a$ two optical wedges $e$ and $f$, which are rotatable about the axis A—A of the casing, are provided, viz. the wedge $e$ together with its frame $e^1$ in a bearing $e^2$, and the wedge $f$ together with its frame $f^1$ in a bearing $f^2$. Behind the wedges $e$ and $f$ there is arranged an Amici prism $g$, which serves in the well-known manner for the achromatization of the boundary line, and an ocular $d$ which, together with the objective $h$, forms a telescope. In the focal plane of the objective, between the objective $h$ and the ocular $d$, a glass plate $i$ and a circular mark $i^1$ are disposed. Near the focal plane of the objective the casing $a$ is widened and contains a disc $j$ and knurled ring $j^1$, which can be rotated about the axis A—A. The said disc $j$, which, on the side facing the ocular, has a number of curves $j^2$ serving as scale for the reading device, is connected with the pair or wedges $e$, $f$ in the following manner. The disc $j$ is provided with teeth $j^3$ meshing with the toothed wheel $k^1$ to whose axis there is secured still another toothed wheel $k^3$ engaging a wheel $l^1$. The wheel $l^1$ is positioned on one end of a shaft $l$ provided in the casing $a$, whereas on the other end of the said shaft $l$ a toothed wheel $l^2$ is disposed. This toothed wheel $l^2$ meshes with teeth $f^3$ of the frame $f^1$ and also with a toothed wheel $m$ which rotates in the bearing $e^2$ on a trunnion $m^1$ and engages teeth $e^3$ of the frame $e^1$. The disc $j$ is partially visible from outside through a window $n$ which is arranged in the wall of the casing $a$ and provided with a graduation graduated in temperature degrees and serving as indicator for the reading device. The frame $b$ containing the measuring prism $c$ is given such a construction that the measuring surface of the prism, which is denominated $c^1$, is uncovered, thus permitting the liquid to come into touch with it. The frame $b$ is apertured also at $b^1$ to receive there through the illuminating rays, which be assumed to be emanated by a source of light o. Consequently, the refractometer represented by the drawing is for examination with reflected light.

The refractometer is applied in the following manner. By manipulating the knurled ring $j^1$, the boundary line is moved into the field of view of the telescope, provided it has got out of same. The boundary line having been liberated from coloured seams by turning the Amica prism g, it is set to coincide with the mark $i^1$ by turning the ring j. From the position that part of the indicator scale, which corresponds to the temperature of the solution under examination, has, compared with the curves $j^2$, which communicate points of equal concentration of the solution in question, the required data are read off direct.

I claim:

1. A refractometer for determining a property of a liquid upon which depends the refractive index of this liquid, containing a prism system with a surface adapted to totally reflect rays which have entered the prism, a telescope so disposed behind the prism system as to be capable of receiving rays passed through the said prism, a reading device comprising a scale and a diagram, which diagram consists of a number of curves, both said parts being displaceable relatively to each other, each of the said curves representing the relation of the said property and the temperature, and the scale indicating one of these two quantities, and each of the said curves pertaining to a certain definite degree of the quantity not indicated on the scale, a mark fixed within said telescope, a deflecting device located behind the said prism system and adapted to adjust the position of the extreme rays which are yet totally reflected at the said surface relatively to the said mark, and means for coupling the reading device and the deflecting device.

2. A refractometer for determining a property of a liquid upon which depends the refractive index of this liquid, containing a prism system with a surface adapted to totally reflect rays which have entered the prism, a telescope so disposed behind the prism system as to be capable of receiving rays passed through the said prism, a reading device comprising a scale and a diagram, which diagram consists of a number of curves, both said parts being displaceable relatively to each other, each of the said curves representing the relation of the said property and the temperature, and the scale indicating the temperature, each of the said curves pertaining to a certain definite degree of the said property, a mark fixed within said telescope, a deflecting device located behind the said prism system and adapted to adjust the position of the extreme rays which are yet totally reflected at the said surface relatively to the said mark, and means for coupling the reading device and the deflecting device.

3. A refractometer for determining a property of a liquid upon which depends the refractive index of this liquid, containing a prism system with a surface adapted to totally reflect rays which have entered the prism, a telescope so disposed behind the prism system as to be capable of receiving rays passed through the said prism, a scale fixed on the instrument, a diagram displaceably disposed on the instrument, which diagram consists of a number of curves each of which represents the relation of the said property and the temperature, while the said scale indicates one of these two quantities, and each of the said curves pertaining to a certain definite degree of the quantity not indicated on the scale, a mark fixed within said telescope, a deflecting device located behind the said prism system and adapted to adjust the position of the extreme rays which are yet totally reflected at the said surface relatively to the said mark, and means for coupling the said diagram and the deflecting device.

4. A refractometer for determining a property of a liquid upon which depends the refractive index of this liquid, containing a prism system with a surface adapted to totally reflect rays which have entered the prism, a telescope so disposed behind the prism system as to be capable of receiving rays passed through the said prism, a reading device comprising a scale and a diagram, which diagram consists of a number of curves, both said parts being displaceable relatively to each other, each of the said curves representing the relation of the said property and the temperature, and the scale indicating one of these two quantities, and each of the said curves pertaining to a certain definite degree of the quantity not indicated on the scale, a mark fixed within said telescope, a deflecting device consisting of two glass wedges located one behind the other and arranged behind the said prism system, means for rotating said two wedges in opposite direction, and means for coupling the reading device and these two wedges.

FRANKLIN PFEIFFER.